(12) United States Patent
Chang et al.

(10) Patent No.: US 11,240,698 B2
(45) Date of Patent: Feb. 1, 2022

(54) WIRELESS PROTOCOL LAYER ENTITY PROCESSING METHOD AND CORRESPONDING USER EQUIPMENT

(71) Applicants: SHARP KABUSHIKI KAISHA, Sakai (JP); FG INNOVATION COMPANY LIMITED, Tuen Mun (HK)

(72) Inventors: Ningjuan Chang, Shanghai (CN); Renmao Liu, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 71 days.

(21) Appl. No.: 16/618,729

(22) PCT Filed: Jun. 7, 2018

(86) PCT No.: PCT/CN2018/090257
§ 371 (c)(1),
(2) Date: Dec. 2, 2019

(87) PCT Pub. No.: WO2018/228267
PCT Pub. Date: Dec. 20, 2018

(65) Prior Publication Data
US 2020/0169912 A1 May 28, 2020

(30) Foreign Application Priority Data
Jun. 13, 2017 (CN) .......................... 201710445073.5

(51) Int. Cl.
*H04W 72/04* (2009.01)
*H04W 28/02* (2009.01)
(Continued)

(52) U.S. Cl.
CPC ....... *H04W 28/0268* (2013.01); *H04W 76/19* (2018.02); *H04W 76/30* (2018.02)

(58) Field of Classification Search
CPC . H04W 28/0268; H04W 76/19; H04W 76/30; H04W 76/27
See application file for complete search history.

(56) References Cited

U.S. PATENT DOCUMENTS

| 10,383,095 | B2* | 8/2019 | Lu .................... H04W 72/1242 |
| 2017/0013668 | A1* | 1/2017 | Chang .................. H04W 76/19 |
| 2018/0279193 | A1* | 9/2018 | Park .................... H04W 36/08 |

OTHER PUBLICATIONS

NPL—source HUAWEI, Title: "Initiation of SDAP Entity", R2-1704986, 3GPP TSG-RAN WG2 Meeting #98, Hangzhou, China, May 15-19, 2017; (Year: 2017).*

(Continued)

*Primary Examiner* — Lan-Huong Truong
(74) *Attorney, Agent, or Firm* — ScienBiziP, P.C.

(57) ABSTRACT

The present disclosure provides a method executed at UE, including: determining initiation of a radio resource control (RRC) connection reestablishment procedure or leaving RRC connected state; and performing the following operations on each of at least one cell group: suspending a service data adaptation protocol (SDAP) operation and/or storing an SDAP configuration in a corresponding cell group configuration; or releasing an SDAP entity used to execute the SDAP operation and/or the SDAP configuration in the corresponding cell group configuration. The present disclosure further provides corresponding UE.

4 Claims, 2 Drawing Sheets

(51) Int. Cl.
  *H04W 76/19* (2018.01)
  *H04W 76/30* (2018.01)

(56) References Cited

OTHER PUBLICATIONS

NPL—source HUAWEI, Title: "QoS message flows", R2-1704977, 3GPP TSG-RAN WG2 Meeting #98, Hangzhou, China, May 15-19, 2017; (Year: 2017).*
NTT Docomo, "New SID Proposal: Study on New Radio Access Technology", RP-160671, 3GPP TSG RAN Meeting #71 Göteborg, Sweden, Mar. 7-10, 2016.
Huawei et al., "Qos message flows", R2-1704977, 3GPP TSG-RAN WG2 Meeting #98, Hangzhou, China, May 15-19, 2017.

* cited by examiner

WIRELESS PROTOCOL LAYER ENTITY PROCESSING METHOD AND CORRESPONDING USER EQUIPMENT

TECHNICAL FIELD

The present disclosure relates to the technical field of wireless communications. More specifically, the present disclosure relates to a wireless protocol layer entity processing method and corresponding user equipment.

BACKGROUND

A new research project on 5G technical standards (see non-patent literature: RP-160671: New SID Proposal: Study on New Radio Access Technology) was proposed by NTT DOCOMO at the 3rd Generation Partnership Project (3GPP) RAN #71 plenary meeting held in March 2016, and was approved. The goal of the research project is to develop a New Radio (NR) access technology to meet all of the application scenarios, requirements, and deployment environments of 5G. NR mainly has three application scenarios: Enhanced Mobile Broadband Communications (eMBB), massive Machine Type Communications (mMTC), and Ultra Reliable and Low Latency Communications (URLLC).

Different from the Long Term Evolution (LTE) system in which the concept of an Evolved Packet System (EPS) bearer is used to achieve end-to-end Quality of Service (QoS) assurance of data transmission, the NR introduces a new QoS structure, i.e., QoS assurance based on a QoS flow. At the NR adhoc conference held in January 2017, RAN2 decided to introduce a new wireless protocol layer to support the newly introduced QoS mechanism, namely the Service Data Adaptation Protocol (SDAP) layer. The wireless protocol layer can at least complete mapping between a Data Radio Bearer (DRB) and a QoS flow, and perform QoS flow ID marking on a data packet. Other functions are still under discussion. This layer is located above the Packet Data Convergence Protocol (PDCP) layer.

After the SDAP layer is introduced, how to manage the SDAP layer and the corresponding SDAP configuration in the Radio Resource Control (RRC) connection management procedure becomes a problem to be concerned and solved by the present invention.

SUMMARY

The objective of the present disclosure is to solve the above-described technical problem. Specifically, the present disclosure aims at solving the technical problem of how to manage an SDAP layer and a corresponding SDAP configuration in an RRC connection management procedure.

In order to achieve the above-described objective, a first aspect of the present disclosure provides a method executed at user equipment (UE), comprising:
   determining initiation of a radio resource control (RRC) connection reestablishment procedure or leaving RRC connected state; and
   performing the following operations on each of at least one cell group:
      suspending a service data adaptation protocol (SDAP) operation and/or retaining an SDAP configuration in a corresponding cell group configuration; or
      releasing an SDAP entity used to execute the SDAP operation and/or the SDAP configuration in the corresponding cell group configuration.

In an exemplary embodiment, the suspending an SDAP operation comprises suspending one or a plurality of the following operations:
   all SDAP operations;
   all SDAP operations associated with a data radio bearer (DRB);
   an SDAP operation in a nontransparent mode;
   an SDAP operation associated with a DRB configured to be in a radio link control acknowledged mode (RLC AM); and
   an SDAP operation associated with a DRB configured to be in a radio link control unacknowledged mode (RLC UM).

In an exemplary embodiment, the SDAP operation comprises one or a plurality of the following items:
   mapping between a DRB and a QoS flow;
   QoS flow ID marking performed on an uplink and/or downlink data packet; and
   reordering and in-order delivery required by a QoS flow-based QoS architecture at an access stratum (AS).

In an exemplary embodiment, the SDAP configuration is used to execute the SDAP operation and comprises one or a plurality of the following items:
   a QoS mapping rule;
   an SDAP identifier;
   a protocol data unit session identity associated with an SDAP entity;
   a reflective QoS configuration;
   a QoS flow identity for the uplink and/or downlink data packet; and
   an indication about whether the QoS flow identity for the uplink and/or downlink data packet needs to be included.

In an exemplary embodiment, the method further comprises: if the SDAP operation is suspended, restoring the SDAP operation when one of the following messages is received:
   an RRC connection reestablishment message;
   an RRC connection resume message;
   an RRC connection setup message; and
   an RRC connection reconfiguration message.

A second aspect of the present disclosure provides user equipment (UE), comprising:
   a communication interface, configured for communication;
   a processor; and
   a memory, having computer-executable instructions stored thereon, the instructions causing the processor to execute the following procedure when executed by the processor:
      determining initiation of a radio resource control (RRC) connection reestablishment procedure by the UE or leaving RRC connected state by the UE; and
      performing the following operations on each of at least one cell group:
         suspending a service data adaptation protocol (SDAP) operation and/or retaining an SDAP configuration in a corresponding cell group configuration; or
         releasing an SDAP entity used to execute the SDAP operation and/or the SDAP configuration in the corresponding cell group configuration.

In an exemplary embodiment, the suspending an SDAP operation comprises suspending one or a plurality of the following operations:
   all SDAP operations;
   all SDAP operations associated with a data radio bearer (DRB);
   an SDAP operation in a nontransparent mode;

an SDAP operation associated with a DRB configured to be in a radio link control acknowledged mode (RLC AM); and an SDAP operation associated with a DRB configured to be in a radio link control unacknowledged mode (RLC UM).

In an exemplary embodiment, the SDAP operation comprises one or a plurality of the following items:
mapping between a DRB and a QoS flow;
QoS flow ID marking performed on an uplink and/or downlink data packet; and
reordering and in-order delivery required by a QoS flow-based QoS architecture at an access stratum (AS).

In an exemplary embodiment, the SDAP configuration is used to execute the SDAP operation and comprises one or a plurality of the following items:
a QoS mapping rule;
an SDAP identifier;
a protocol data unit session identity associated with an SDAP entity;
a reflective QoS configuration;
a QoS flow identity for the uplink and/or downlink data packet; and
an indication about whether the QoS flow identity for the uplink and/or downlink data packet needs to be comprised.

In an exemplary embodiment, the instructions further cause the processor to execute the following procedure when executed by the processor:
if the SDAP operation is suspended, restoring the SDAP operation when one of the following messages is received:
an RRC connection reestablishment message;
an RRC connection resume message;
an RRC connection establishment message; and
an RRC connection reconfiguration message.

The above-described solution provided by the present disclosure provides a solution of how to manage an SDAP layer and a corresponding SDAP configuration in a radio resource control connection management procedure. For example, the SDAP operation is suspended when the UE initiates the RRC connection reestablishment procedure, so as to suspend a data packet processing behavior at a RAN side, thereby reducing a packet loss during QoS mapping reconfiguration performed after RRC reestablishment, reducing data packet disorders as well as delays and resource overheads caused by retransmission triggered thereby. The SDAP entity used to execute the SDAP operation and/or the SDAP configuration in the corresponding cell group configuration is released when the UE initiates the RRC connection reestablishment procedure, so as to simplify an operation and implementation of the UE, that is, during the RRC connection reestablishment procedure or after leaving the RRC connected state, the UE does not need to maintain and store the SDAP entity and the corresponding configuration.

Additional aspects and advantages of the present disclosure will be described in the following description, which will become apparent from the description below or be understood through the practice of the present disclosure.

DESCRIPTION OF THE DRAWINGS

The above and other features of the present disclosure will become more apparent through the following detailed description in conjunction with the accompanying drawings.

DETAILED DESCRIPTION

Figure 1:
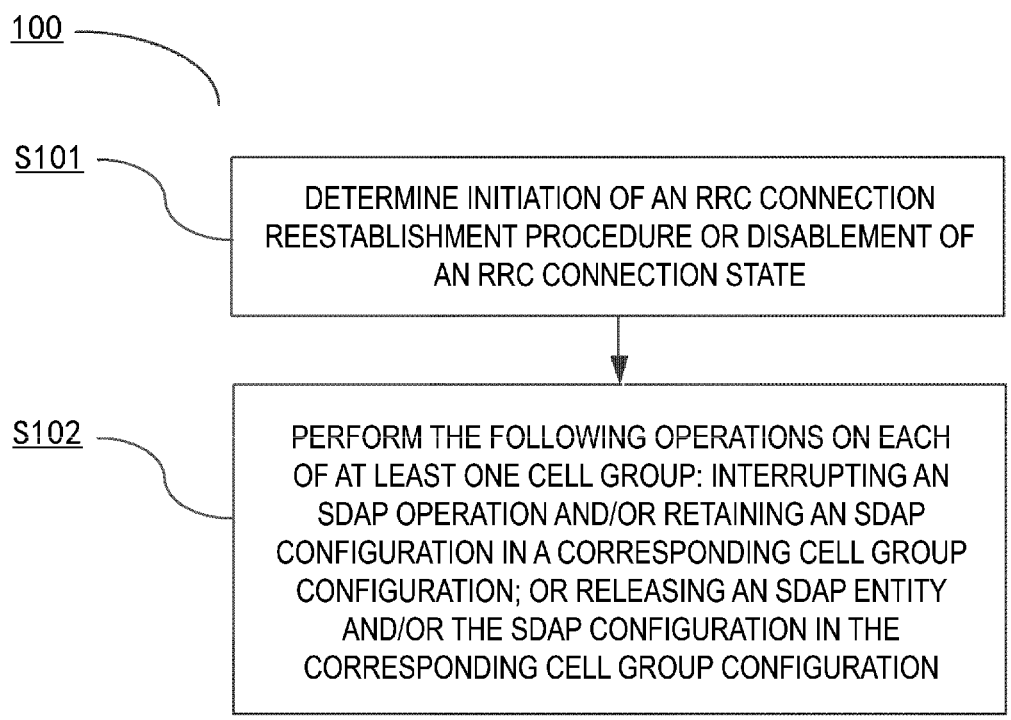
FIG. 1 schematically illustrates a flowchart of a wireless protocol layer entity processing method executed at UE according to an exemplary embodiment of the present invention.

The following describes the present application in detail with reference to the accompanying drawings and specific embodiments. It should be noted that the present application should not be limited to the specific embodiments described below. In addition, for simplicity, detailed description of the known art not directly related to the present application is omitted to prevent confusion in understanding the present application.

Some terms involved in the present disclosure are described below. If not specifically indicated, the terms involved in the present disclosure use the definitions herein. The terms or information elements given in the present disclosure may be named differently in NR, LTE, and eLTE, but unified terms or information elements are used in the present disclosure. When applied to a specific system, the terms or information elements may be replaced with terms or information elements used in the corresponding system, and values of the information elements are those specified in the corresponding system. In the present invention, the base station may be a base station of any type, including Node B, enhanced Node B (eNB), or may be gNB, i.e., a base station of a 5G communication system, or may be a micro base station, a picocell base station, a macro base station, a home base station, or the like. The cell may be a cell of the base station of any type described above. In the present invention, PDCP may represent an NR PDCP entity or a PDCP entity of LTE or eLTE; Radio Link Control (RLC) may represent an NR RLC entity or an RLC entity of LTE or eLTE. Similar to those in LTE, RLC UM represents an unacknowledged mode, and RLC AM represents an acknowledged mode.

The terms involved in the present disclosure are described below.

QoS flow: also known as 5G QoS flow, which is a minimum granularity used for a QoS forwarding treatment in a 5G system. All services mapped to the same 5G QoS flow are subject to the same forwarding treatment (for example, a scheduling policy, a queue management policy, a rate forming policy, an RLC configuration, and the like). Different QoS forwarding treatments require different QoS flows.

Protocol Data Unit (PDU): a unit for processing data by a protocol layer.

PDU session: an association between UE and a data network and used to provide a PDU connection service. The type of the association may be an IP, Ethernet, or unstructured network.

PDU connection service: a service providing PDU switching between UE and a data network.

Master Base Station (Master eNB, denoted as MeNB (corresponding to a base station of E-UTRAN, LTE, or eLTE) or MgNB (corresponding to a base station of 5G-RAN or NR)): a base station that at least terminates at a control node mobility management entity (denoted as S1-MME) for processing an interaction between UE and a core network in multi-connection. In the present invention, the master base station is denoted as MeNB. It should be noted that all schemes or definitions applicable to the MeNB are likewise applicable to the MgNB.

Secondary Base Station (Secondary eNB, denoted as SeNB (corresponding to a base station of E-UTRAN, LTE, or eLTE) or SgNB (corresponding to a base station of 5G-RAN or NR)): a base station which provides additional radio resources for UE but does not serve as an MeNB in multi-connection. In the present invention, the secondary base station is denoted as SeNB. It should be noted that all schemes or definitions applicable to the SeNB are likewise applicable to the SgNB.

Primary Cell (PCell): a cell operating on the primary frequency, and is a cell on which UE performs an initial connection establishment procedure or initiates a connection reestablishment procedure or which is designated as a primary cell during a handover procedure.

Secondary Cell (SCell): a cell operating on the secondary frequency. The cell can be configured after an RRC connection is established and can be used for providing additional radio resources.

Primary Secondary Cell (PSCell): a cell that indicates, during execution of changing an SCG, an SCG cell by which UE performs random access.

Master Cell Group (MCG): for UE not provided with multi-connectivity, the MCG consists of all serving cells; for UE provided with multi-connectivity, the MCG consists of a subset of serving cells (namely, a group of serving cells associated with an MeNB or MgNB) including a PCell and 0, 1, or a plurality of SCells.

Secondary Cell Group (SCG): a group of serving cells associated with an SeNB or SgNB in multi-connectivity. The SCG includes one PSCell, and may further include one or more SCells.

Multi-connectivity: an operation mode of UE in an RRC connected state. In the multi-connectivity, a plurality of cell groups are configured, and the plurality of cell groups comprise one MCG and one or a plurality of SCGs (namely, the UE is connected to a plurality of base stations). If only one MCG (or MeNB or MgNB) and one SCG (or SeNB or SgNB) are configured, the multi-connectivity is referred to as dual-connectivity. That is, the UE in the connected state and having a plurality of receivers and/or transmitters is configured to use EUTRAN and/or 5G-RAN radio resources provided by a plurality of different schedulers; and the schedulers can be connected by means of non-ideal backhaul or ideal backhaul. The multi-connectivity defined in the present disclosure includes the dual-connectivity. A multi-connectivity data transmission mode includes, but is not limited to, data duplication and link selection.

The content of the present invention can be applied to a system connected to a 5G core network, for example, an NR system and an eLTE system, and can also be applied to a subsequently evolved communication system, where the eLTE system refers to a system of LTE studied in subsequent releases connected to the 5G core network (next generation core network).

As described in the background section, in the present invention, an SDAP entity is used to support all functions of a QoS flow-based QoS architecture in the 5G system at an access stratum (AS), that is, capable of performing corresponding operations, including: mapping between a DRB and a QoS flow, QoS flow ID marking performed on an uplink and/or downlink data packet, and further including other functions required by the QoS flow-based QoS architecture at the AS stratum, for example, reordering, in-order delivery, and the like. The entity can also be named differently. An SDAP configuration includes a corresponding configuration used to support an SDAP layer function, and the configuration may include any one or a plurality of a QoS mapping rule (for example, a mapping rule between the DRB and the QoS flow, a mapping rule between the DRB and the SDAP, a mapping rule between the QoS flow and the SDAP, a mapping rule between the DRB and the PDU session, and the like), an SDAP identifier, a protocol data unit session identity (PDU session identity/identifier) associated to the SDAP entity, a reflective QoS configuration (for example, reflective mapping enablement or disablement), a QoS flow identity for the uplink and/or downlink data packet, an indication about whether the QoS flow identity for the uplink and/or downlink data packet needs to be included, and the like. The configuration may be a configuration obtained by means of an RRC message, or may be a configuration obtained in other manners, for example, a reflective QoS mechanism configuration obtained by means of information in a user plane data packet in a reflective QoS mechanism.

When dual connectivity (DC) (also known as multiple connectivity (MC)) is not configured, one PDU session may correspond to one SDAP entity; when DC is configured, the same QoS flow or different QoS flows of one PDU session may be transmitted on both an MCG (also known as a master base station such as MeNB/MgNB, or a master node, or a master network) and an SCG (also known as a secondary base station such as SeNB/SgNB, or a secondary node, or a secondary network), and in this case one PDU session corresponds to two SDAP entities of which one corresponds to the MCG and the other corresponds to the SCG. With extension, it can also be considered that in the case of more than two serving nodes, one PDU session corresponds to a plurality of SDAP entities, and each SDAP entity corresponds to one serving node or serving cell group consisting of serving cells of the serving node. The present disclosure describes the cases of not configuring DC and configuring DC, and is likewise applicable to a multi-connection scenario in which more than two serving nodes are present.

A wireless protocol layer entity processing method executed at UE according to an exemplary embodiment of the present disclosure will be described below with reference to FIG. 1.

FIG. 1 illustrates a flowchart of the wireless protocol layer entity processing method 100 executed at the UE according to the exemplary embodiment of the present invention. As illustrated in FIG. 1, the method 100 may include steps S101 and S102.

In step S101, the UE determines to initiate a radio resource control (RRC) connection reestablishment procedure or leaving RRC connected state.

In step S102, when the UE initiates the radio resource control (RRC) connection reestablishment procedure or leaving the RRC connected state, the UE can execute the following operations:

suspending a service data adaptation protocol (SDAP) operation and/or storing an SDAP configuration; or releasing an SDAP entity used to execute the SDAP operation and/or the SDAP configuration.

Preferably, in step S102, when the UE initiates the radio resource control (RRC) connection reestablishment procedure or leaving the RRC connected state, the UE can execute the following operations on each of at least one cell group:

suspending a service data adaptation protocol (SDAP) operation and/or storing an SDAP configuration in a corresponding cell group configuration; or releasing an SDAP entity used to execute the SDAP operation and/or the SDAP configuration in the corresponding cell group configuration.

Various implementation manners of the method 100 will be described in detail below with reference to specific scenarios.

Embodiment 1

This embodiment provides a wireless protocol layer (specifically, an SDAP) entity processing method in an RRC connection reestablishment scenario.

In step S101, the UE (specifically, an RRC layer of the UE, hereinafter inclusive) determines to initiate the RRC connection reestablishment procedure.

Specifically, in step S101, a triggering condition of initiating the RRC connection reestablishment procedure by the UE may include detection of a radio link failure, an RLC problem (for example, the RLC reaches a maximum number of retransmissions), a handover failure, an RRC connection reconfiguration failure, an integrity check failure, and the like, but is not limited thereto.

In step S102, the UE can suspend the SDAP operation. Preferably, the UE can suspend the SDAP operation for each of the at least one cell group.

It should be understood that, the suspending the SDAP operation herein can be further described as: suspending the SDAP operation, suspending the SDAP entity used to execute the SDAP operation (i.e., suspending the SDAP operation executed by the SDAP entity), suspending the SDAP entity, stopping an SDAP behavior/operation, or the like.

Specifically, in step S102, the suspending the SDAP operation may include suspending one or a plurality of the following operations:

all SDAP operations;
all SDAP operations associated with a DRB;
an SDAP operation in a nontransparent mode;
an SDAP operation associated with a DRB configured to be in an RLC AM; and
an SDAP operation associated with a DRB configured to be in an RLC UM mode.

Specifically, the SDAP operation may include one or a plurality of the following operations:

mapping between a DRB and a QoS flow;
QoS flow ID marking performed on an uplink and/or downlink data packet; and
reordering and in-order delivery required by a QoS flow-based QoS architecture at an access stratum (AS).

In the above description, the nontransparent mode refers to a mode of the SDAP. In this mode, when the data packet passes through the SDAP entity, the SDAP entity does not perform any of the above-described operations such as adding a QoS flow identity, and adding an SDAP packet header (including a QoS flow ID and other fields), that is, the mode is equivalent to transparent transmission by which a data packet (may be buffered) received from an upper layer (a non-access stratum or an IP layer) is directly forwarded to a lower layer (i.e., a PDCP layer).

Specifically, suspending the SDAP operation associated with the DRB configured to be in the RLC AM may include: when RLC modes corresponding to DRBs associated with the SDAP entity all belong to an AM mode, suspending the SDAP operation; or when RLC modes corresponding to DRBs associated with the SDAP entity include an AM mode, suspending the SDAP operation.

Specifically, suspending the SDAP operation associated with the DRB configured to be in the RLC UM may include: when RLC modes corresponding to DRBs associated with the SDAP entity all belong to a UM mode, suspending the SDAP entity; or when RLC modes corresponding to DRBs associated with the SDAP entity include a UM mode, suspending the SDAP operation.

Specifically, in the case of not configuring DC, one PDU session may correspond to one SDAP entity which corresponds to one cell group, and the UE can suspend an SDAP operation for the cell group. In the case of configuring DC, one PDU session may correspond to two SDAP entities of which one SDAP entity corresponds to the MCG and the other SDAP entity corresponds to the SCG, and the UE can suspend an SDAP operation for the MCG and suspend an SDAP operation for the SCG.

In another implementation manner of step S102, the UE can store the SDAP configuration. Preferably, the UE can store the SDAP configuration in the corresponding cell group configuration for each of the at least one cell group.

Specifically, in the case of not configuring DC, one PDU session may correspond to one SDAP entity which corresponds to one cell group, and the UE can store an SDAP configuration in a configuration of the cell group for the cell group.

In the case of configuring DC, one PDU session may correspond to two SDAP entities of which one SDAP entity corresponds to the MCG and the other SDAP entity corresponds to the SCG, and the UE can store an SDAP configuration in an MCG configuration for the MCG and store an SDAP configuration in an SCG configuration for the SCG.

Herein, the MCG configuration refers to a wireless configuration for the MCG and/or SCG which is received from the SgNB or MgNB and performed by the MgNB for completing data transmission on the MCG and/or SCG, and includes one or a plurality of a measurement configuration, mobility control information, a dedicated radio resource configuration, a security configuration, an antenna configuration, a secondary cell configuration, other configurations (otherconfig information element), a full configuration (full-config information element), wireless local area network offload information, a side link configuration, power coordination information, a primary secondary cell configuration, and the like. Optionally, the MCG configuration further includes the SCG configuration as described below.

The storing the SDAP configuration in the MCG configuration can be further described as releasing the (whole) MCG configuration, except the SDAP configuration. The above-described operation may further be releasing the MCG configuration, except the SDAP configuration and the DRB configuration.

Herein, the SCG configuration refers to a wireless configuration for the SCG which is received from the SgNB or MgNB and performed by the SgNB (or MgNB) for completing data transmission on the SCG, and includes an SCG releasing instruction, an SCG-configPartMCG configuration, an scg-ConfigPartSCG configuration, and the like. The scg-ConfigPartSCG configuration includes an SCG dedicated radio resource configuration, an SCG secondary cell releasing list, a primary secondary cell adding and modifying configuration, an SCG secondary cell adding and modifying list, SCG mobility control information, and the like.

The storing the SDAP configuration in the SCG configuration can be further described as releasing the (whole) SCG configuration, except the SDAP configuration. The above-described operation may further be releasing the SCG configuration, except the SDAP configuration and the DRB configuration.

In yet another implementation manner of step S102, the UE can suspend the SDAP operation and store the SDAP configuration. Preferably, the UE can suspend the SDAP operation and/or store the SDAP configuration in the corresponding cell group configuration for each of the at least one cell group.

Optionally, the method 100 may further include step S103: if the SDAP operation is suspended, the UE can restore the SDAP operation when receiving the RRC connection reestablishment message; or restore the SDAP operation when receiving the RRC connection reconfiguration message after RRC connection reestablishment succeeds. Herein, the restoring the SDAP operation refers to restoring an SDAP-related operation corresponding to the above-described SDAP operations, for example, processing the data packet according to the mapping rule between the DRB and the QoS flow.

Specifically, the restoring the SDAP operation when the RRC connection reconfiguration message is received after the RRC connection reestablishment succeeds may include: when the RRC connection reconfiguration message including the SDAP configuration is received after the RRC connection reestablishment succeeds, restoring the SDAP operation or performing reconfiguration according to the received configuration.

Optionally, the storing the SDAP configuration in the SCG configuration in step S102 may further occur when the UE receives an RRC message including the SCG configuration and the SCG configuration is set to "release".

In this embodiment, the SDAP operation is suspended when the UE initiates the RRC connection reestablishment procedure, so as to suspend a data packet processing behavior at a RAN side, thereby reducing a packet loss during QoS mapping reconfiguration performed after RRC reestablishment, reducing data packet disorders and a delay and resource overheads caused by retransmission triggered thereby.

Embodiment 2

This embodiment provides a wireless protocol layer (specifically, an SDAP) entity processing method in an RRC connection reestablishment scenario.

In step S101, the UE (specifically, an RRC layer of the UE, hereinafter inclusive) determines to initiate the RRC connection reestablishment procedure.

Specifically, in step S101, a triggering condition of initiating the RRC connection reestablishment procedure by the UE may include detection of a radio link failure, an RLC problem (for example, the RLC reaches a maximum number of retransmissions), a switching failure, an RRC connection reconfiguration failure, an integrity detection failure, and the like, but is not limited thereto.

In step S102, the UE can release the SDAP entity used to execute the SDAP operation and/or the SDAP configuration. Preferably, the UE can release the SDAP entity used to execute the SDAP operation and/or the SDAP configuration in the corresponding cell group configuration for each of the at least one cell group.

In this embodiment, the method 100 corresponds to processing without a guarantee for a packet loss, that is, release of the SDAP entity and/or the SDAP configuration may cause a packet loss, but it is assumed that this packet loss is tolerable in a 5G architecture. This method has the benefit that the UE operation and implementation can be simplified, that is, in the RRC connection reestablishment procedure, the UE does not need to maintain and store the SDAP entity and the corresponding configuration.

Embodiment 3

This embodiment provides a wireless protocol layer (specifically, an SDAP) entity processing method in a scenario that upon leaving RRC connected state.

In step S101, the UE (specifically, an RRC layer of the UE, hereinafter inclusive) can determine to leaving the RRC connected state.

In this step, leaving the RRC connected state by the UE may occur when an RRC connection is released (preferably, entering into an RRC idle state; or alternatively, entering into an RRC inactive state), or alternatively, may occur when the RRC connection is suspended (entering into the RRC inactive state, or in the LTE the RRC idle state in which the RRC connection is suspended), but is not limited thereto.

Specifically, step S101 can be further described as the UE determining to enter into the RRC idle state or enter into the RRC idle state from the RRC connected state or an RRC non-idle state.

In step S102, the UE suspend the SDAP operation. Preferably, the UE can suspend the SDAP operation for each of the at least one cell group.

It should be understood that, the suspending the SDAP operation herein can be further described as: suspending the SDAP operation, suspending the SDAP entity used to execute the SDAP operation (i.e., suspending the SDAP operation executed by the SDAP entity), suspending the SDAP entity, stopping an SDAP behavior/operation, or the like.

Specifically, in step S102, the suspending the SDAP operation may include suspending one or a plurality of the following operations:
  all SDAP operations;
  all SDAP operations associated with a DRB;
  an SDAP operation in a nontransparent mode;
  an SDAP operation associated with a DRB configured to be in an RLC AM; and
  an SDAP operation associated with a DRB configured to be in an RLC UM mode.

Specifically, the SDAP operation may include one or a plurality of the following operations:
  mapping between the DRB and a QoS flow;
  QoS flow ID marking performed on an uplink and/or downlink data packet; and
  reordering and in-order delivery required by a QoS flow-based QoS architecture at an access stratum (AS).

In the above description, the nontransparent mode refers to a mode of the SDAP. In this mode, when the data packet passes through the SDAP entity, the SDAP entity does not perform any of the above-described operations such as adding a QoS flow identity, and adding an SDAP packet header (including a QoS flow ID and other fields), that is, the mode is equivalent to transparent transmission by which a data packet (may be buffered) received from an upper layer (a non-access stratum or an IP layer) is directly forwarded to a lower layer (i.e., a PDCP layer).

Specifically, suspending the SDAP operation associated with the DRB configured to be in the RLC AM may include: when RLC modes corresponding to DRBs associated with the SDAP entity all belong to an AM mode, suspending the SDAP operation; or when RLC modes corresponding to DRBs associated with the SDAP entity include an AM mode, suspending the SDAP operation.

Specifically, suspending the SDAP operation associated with the DRB configured to be in the RLC UM may include: when RLC modes corresponding to DRBs associated with the SDAP entity all belong to a UM mode, suspending the SDAP entity; or when RLC modes corresponding to DRBs associated with the SDAP entity include a UM mode, suspending the SDAP operation.

Specifically, in the case of not configuring DC, one PDU session may correspond to one SDAP entity which corresponds to one cell group, and the UE can suspend an SDAP operation for the cell group. In the case of configuring DC, one PDU session may correspond to two SDAP entities of which one SDAP entity corresponds to the MCG and the other SDAP entity corresponds to the SCG, and the UE can suspend an SDAP operation for the MCG and suspend an SDAP operation for the SCG.

In another implementation manner of step S102, the UE can store the SDAP configuration. Preferably, the UE can store the SDAP configuration in the corresponding cell group configuration for each of the at least one cell group.

Specifically, in the case of not configuring DC, one PDU session may correspond to one SDAP entity which corresponds to one cell group, and the UE can store an SDAP configuration in a configuration of the cell group for the cell group.

In the case of configuring DC, one PDU session may correspond to two SDAP entities of which one SDAP entity corresponds to the MCG and the other SDAP entity corresponds to the SCG, and the UE can store an SDAP configuration in an MCG configuration for the MCG and store an SDAP configuration in an SCG configuration for the SCG.

The storing the SDAP configuration in the MCG configuration can be further described as releasing the (whole) MCG configuration, except the SDAP configuration. The above-described operation may further be releasing the MCG configuration, except the SDAP configuration and the DRB configuration.

The storing the SDAP configuration in the SCG configuration can be further described as releasing the (whole) SCG configuration, except the SDAP configuration. The above-described operation may further be releasing the SCG configuration, except the SDAP configuration and the DRB configuration.

In yet another implementation manner of step S102, the UE can suspend the SDAP operation and store the SDAP configuration. Preferably, the UE can suspend the SDAP operation and/or store the SDAP configuration in the corresponding cell group configuration for each of the at least one cell group.

Optionally, the method 100 may further include step S103: if the SDAP operation is suspended, the UE can restore the SDAP operation when determining that the RRC connection resume message or RRC connection setup message is received; or restore the SDAP operation when receiving the RRC connection reconfiguration message after RRC connection setup/resume succeeds. Herein, the restoring the SDAP operation refers to restoring an SDAP-related operation corresponding to the above-described SDAP operations, for example, processing the data packet according to the mapping rule between the DRB and the QoS flow.

Specifically, the restoring the SDAP entity when the RRC connection reconfiguration message is received after the RRC connection setup/resume succeeds may include: when the RRC connection reconfiguration message including the SDAP configuration is received after the RRC connection setup/resume succeeds, restoring the SDAP entity or performing reconfiguration according to the received configuration.

In this embodiment, the SDAP operation is suspended when the UE determines to initiate the RRC connection reestablishment procedure, so as to suspend a data packet processing behavior at a RAN side, thereby reducing a packet loss during QoS mapping reconfiguration performed after RRC reestablishment, reducing data packet disorders and a delay and resource overheads caused by retransmission triggered thereby.

Embodiment 4

This embodiment provides a wireless protocol layer (specifically, an SDAP) entity processing method in a scenario that upon leaving RRC connected state.

In step S101, the UE (specifically, an RRC layer of the UE, hereinafter inclusive) can determine to leaving the RRC connected state.

In this step, leaving the RRC connected state by the UE may occur when an RRC connection is released (preferably, entering into an RRC idle state; or alternatively, entering into an RRC inactive state), or alternatively, may occur when the RRC connection is suspended (entering into the RRC inactive state, or in the LTE the RRC idle state in which the RRC connection is suspended), but is not limited thereto.

Specifically, step S101 can be further described as the UE determining to enter into the RRC idle state or enter into the RRC idle state from the RRC connection state or an RRC non-idle state.

In step S102, the UE can release the SDAP entity used to execute the SDAP operation and/or the SDAP configuration. Preferably, the UE can release the SDAP entity used to execute the SDAP operation and/or the SDAP configuration in the corresponding cell group configuration for each of the at least one cell group.

The releasing the SDAP entity can be further described as releasing SDAP entities associated with all established radio bearers (or DRB); or described as releasing all SDAP entities.

Optionally, before step S102, the method may further include: performing step S102 when leaving RRC connected state is not triggered by suspending the RRC connection. The leaving RRC connected state not triggered by suspending the RRC connection may be further described as: leaving RRC connected state is not triggered by entering into an RRC inactive state.

In this embodiment, the UE operation and implementation can be simplified, that is, upon leaving the RRC connected state, the UE does not need to maintain and store the SDAP entity and the corresponding configuration.

Figure 2:
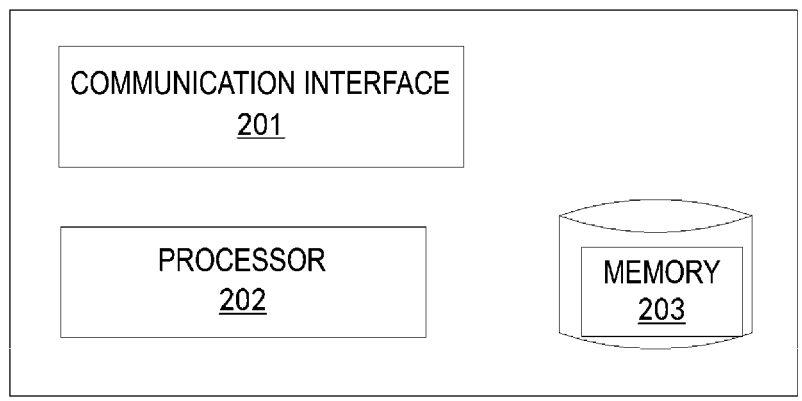
FIG. 2 schematically illustrates a structural block diagram of UE executing a wireless protocol layer entity processing method according to an exemplary embodiment of the present invention.

A structure of UE according to an exemplary embodiment of the present invention will be described below with reference to FIG. 2. FIG. 2 schematically illustrates a structural block diagram of UE executing a wireless protocol layer entity processing method according to an exemplary embodiment of the present invention. UE 200 can be used to execute the method 100 described with reference to FIG. 1. For the sake of simplicity, only a schematic structure of the UE according to the exemplary embodiment of the present disclosure will be described herein, and details already described in the method 100 described above with reference to FIG. 1 are omitted.

As illustrated in FIG. 2, the UE 200 includes a communication interface 201 used for external communication; a processing unit or processor 202, wherein the processor 202 may be a single unit or a combination of a plurality of units and is used to execute different steps of the method; a memory 203 having computer-executable instructions stored thereon, the instructions causing the processor 202 to execute the following procedure when executed by the processor 202: determining initiation of a radio resource control (RRC) connection reestablishment procedure or leaving RRC connected state; and when the UE initiates the radio resource control (RRC) connection reestablishment procedure or leaving the RRC connected state, performing the following operations on each of at least one cell group: suspending a service data adaptation protocol (SDAP) operation and/or storing an SDAP configuration in a corresponding cell group configuration; or releasing an SDAP entity used to execute the SDAP operation and/or the SDAP configuration in the corresponding cell group configuration.

In an exemplary embodiment, the suspending the SDAP operation may include suspending one or a plurality of the following operations:

all SDAP operations;

all SDAP operations associated with a data radio bearer (DRB);

an SDAP operation in a nontransparent mode;

an SDAP operation associated with a DRB configured to be in a radio link control acknowledged mode (RLC AM); and an SDAP operation associated with a DRB configured to be in a radio link control unacknowledged mode (RLC UM).

In an exemplary embodiment, the SDAP operation may include one or a plurality of the following items:

mapping between the DRB and a QoS flow;

QoS flow ID marking performed on an uplink and/or downlink data packet; and reordering and in-order delivery required by a QoS flow-based QoS architecture at an access stratum (AS).

In an exemplary embodiment, the SDAP configuration is used to execute the SDAP operation and may include one or a plurality of the following items:

a QoS mapping rule;

an SDAP identifier;

a protocol data unit session identity associated with an SDAP entity;

a reflective QoS configuration;

a QoS flow identity for the uplink and/or downlink data packet; and an indication about whether the QoS flow identity for the uplink and/or downlink data packet needs to be comprised.

In an exemplary embodiment, the instructions further cause the processor to execute the following procedure when executed by the processor:

if the SDAP operation is suspended, restoring the SDAP operation when one of the following messages is received:

an RRC connection reestablishment message;

an RRC connection resume message;

an RRC connection setup message; and an RRC connection reconfiguration message.

The program running on the device according to the present invention may be a program that enables the computer to implement the functions of the embodiments of the present invention by controlling a central processing unit (CPU). The program or information processed by the program can be stored temporarily in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions can be achieved by reading programs recorded on the recording medium and executing them by the computer system. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or a plurality embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulted from the appropriate combinations of the technical means disclosed in different embodiments are also included within the technical scope of the present invention. In addition, components with the same effect described in the above embodiments may be replaced with one another.

The invention claimed is:

1. A method performed by a user equipment (UE), the method comprising:
   entering a radio resource control (RRC) inactive state; and
   storing a service data adaptation protocol (SDAP) configuration,
   wherein the SDAP configuration includes a protocol data unit (PDU) session identifier associated with an SDAP entity and quality of service (QoS) flow mapping rules to a Data Radio Bearer (DRB).

2. A method performed by a user equipment (UE), the method comprising:
   upon entering a radio resource control (RRC) idle state, releasing associated service data adaptation protocol (SDAP) for all established radio bearers.

3. A user equipment (UE), comprising:
   storing circuitry; and
   state controlling circuitry, wherein:
   the state controlling circuitry is configured to cause the UE to enter a radio resource control (RRC) inactive state;

the storing circuitry is configured to store a service data adaptation protocol (SDAP) configuration; and the SDAP configuration includes a protocol data unit (PDU) session identifier associated with an SDAP entity and quality of service (QoS) flow mapping rules to a Data Radio Bearer (DRB).

4. A user equipment (UE), comprising releasing circuitry, wherein upon entering a radio resource control (RRC) idle state, the releasing circuitry is configured to release associated service data adaptation protocol (SDAP) for all established radio bearers.

\* \* \* \* \*